(12) United States Patent
Soga et al.

(10) Patent No.: US 6,266,601 B1
(45) Date of Patent: Jul. 24, 2001

(54) DEVICE FOR CONTROLLING RUNNING BEHAVIOR OF VEHICLE BY MATHEMATICAL TIRE MODEL WITH COMPENSATION FOR BRAKE MALFUNCTION

(75) Inventors: Masayuki Soga, Susono; Yoshikazu Hattori, Aichi-gun, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/469,267

(22) Filed: Dec. 22, 1999

(30) Foreign Application Priority Data

Feb. 1, 1999 (JP) ................................ 11-024062

(51) Int. Cl.$^7$ ................................................ G06F 17/00
(52) U.S. Cl. .............................. 701/74; 701/77; 303/140; 303/146; 180/197
(58) Field of Search ................................. 701/70, 72, 74, 701/77, 78, 83; 303/140, 146; 180/197

(56) References Cited

U.S. PATENT DOCUMENTS

| | | | |
|---|---|---|---|
| 5,668,724 | 9/1997 | Ehret et al. | 701/80 |
| 5,722,911 | 3/1998 | Ibaraki et al. | 477/3 |
| 5,839,083 | * 11/1998 | Sugiyama | 701/62 |
| 5,899,952 | * 5/1999 | Fukada | 701/74 |

FOREIGN PATENT DOCUMENTS

| | | |
|---|---|---|
| 40 30 704 A1 | 4/1992 | (DE) . |
| 0829401 | 3/1998 | (EP) . |
| 9-48338 | 2/1997 | (JP) . |
| 10-100884 | 4/1998 | (JP) . |
| 2835173 | 10/1998 | (JP) . |

OTHER PUBLICATIONS

Van Zanten et al., *Control Aspects of the Bosch–VDC*, Internatuon Symposium on Advanced Vehicle Control, pp. 573–607.

Koibuchi et al., *Vehicle Stability Control in Limit Cornering by Active Braking*, SAE 960487.

* cited by examiner

Primary Examiner—William A. Cuchlinski, Jr.
Assistant Examiner—Arthur D. Donnelly
(74) Attorney, Agent, or Firm—Oliff & Berridge, PLC

(57) ABSTRACT

A control device for controlling the running behavior of a four wheeled vehicle has a mathematical tire model of each wheel defining a relationship between longitudinal and lateral forces vs. slip ratio, synthesizes the mathematical tire model at zero slip and a control input from an outside running behavior controller such as a spin controller or a driftout controller to generate nominal values of longitudinal force, lateral force and yaw moment of the vehicle body, and controls the slip ratio of the wheels through cyclic adjustment so as to approach the differences between the nominal values and the actual values in the longitudinal force, lateral force and yaw moment of the vehicle body to the corresponding differences of those parameters due to differentiation thereof by the slip ratio based upon the mathematical tire model, wherein when an uncontrollable braking force is applied to any one of the wheels due to a malfunction of the brake system, the nominal values of the longitudinal force and the yaw moment are modified to be decreased as much as an additional longitudinal force and an additional yaw moment corresponding respectively to a longitudinal force and a yaw moment generated in the vehicle by a difference between the uncontrollable braking force and a braking force to be applied to the one wheel according to the slip control.

8 Claims, 8 Drawing Sheets

DEVICE FOR CONTROLLING RUNNING BEHAVIOR OF VEHICLE BY MATHEMATICAL TIRE MODEL WITH COMPENSATION FOR BRAKE MALFUNCTION

BACKGROUND OF THE INVENTION

1. Field of the Invention

The present invention relates to a device for controlling a running behavior of vehicles, and more particularly, to a device for conducting such a control of a four wheeled vehicle based upon a mathematical tire model simulating the performance of longitudinal and lateral forces vs. slip ratio of the tire of each wheel, with a compensation for a malfunction of a brake system.

2. Description of the Prior Art

It is known in the art that the tires of the wheels of vehicles such as automobiles generally exhibit a performance such as exemplarily shown in the map of FIG. 7 with respect to the relationship between the longitudinal or lateral force and the slip ratio. Of course, the actual performance of each particular tire differs from the shown performance in the shape of the curves as well as in the magnitude of the scales according to its tread pattern and respective operational conditions such as a road surface condition, etc.

Further, it is also known in the art that such a performance between the longitudinal or lateral force and the slip ratio of the tires of wheels of vehicles can be mathematically simulated by the following equations:

$$Ftxi = \frac{\xi i^2 Ks}{1-Si} Si - \mu W i \cos\theta i (1 - 3\xi i^2 + 2\xi i^3) \quad (1)$$

$$Ftyi = \frac{\xi i^2 Kb \tan\beta i}{1-SAi} - \mu W i \sin\theta i (1 - 3\xi i^2 + 2\xi i^3) \quad (2)$$

wherein, generalizing by i such suffixes as fr, fl, rr and rl indicating the pertinency to front right, front left, rear right and rear left wheels of a common four wheeled vehicle each bearing the tire, Ftxi and Ftyi are the longitudinal and lateral components of a force Fti acting at a tire (wheel) as illustrated in FIG. 8, and 0 i is the angle between Fti and Ftxi, Si is a slip ratio of the tire defined as below by equation 5, and other parameters are as defined by the following:

$$Si = \frac{u - R\varpi}{u} \quad (5)$$

wherein u is vehicle speed at the tire, R is radius of the tire, and ω is angular speed of the tire ($-\infty < Si \leq 1.0$)

$$\cos\theta i = \frac{Si}{\lambda i} \quad (6)$$

$$\sin\theta i = \frac{Kb \tan\beta i}{Ks \lambda i} \quad (7)$$

$$\lambda i = \sqrt{Si^2 + \frac{Kb^2 \tan^2\beta i}{Ks^2}} \quad (8)$$

$$\xi i = 1 - \frac{Ks \lambda i}{3\mu Wi(1-Si)} \quad (9)$$

wherein βi is slip angle of the wheel, Wi is vertical load on each wheel, Kb is the inclination at βi=0 of a curve of the slip angle βi vs. the lateral force Ftyi such as shown in FIG. 9 and Ks is the inclination at Si=0 of a curve of the slip angle Si vs. the longitudinal force Ftxi such as shown in FIG. 10.

The above equations are mathematical analyses of the relationships among such parameters as the longitudinal and lateral forces, the slip ratio, the slip angle, the vertical load and the friction coefficient with respect to each single tire. On the other hand, the running behavior of a four wheeled vehicles is a matter of interrelations among such respective performances of the four wheels. FIG. 11 shows an example of the yaw moment applied to the vehicle body of a four wheeled vehicle by a braking of each of the four wheels when the vehicle is running out of a straight course.

It would be contemplated to apply the above mathematical analyses to the running behavior control of four wheeled vehicles by preparing certain maps of relationships between or among each two or three of those parameters. However, if a four wheeled vehicle is mathematically controlled of its running behavior based upon a mathematical tire model such as expressed by the above-mentioned equations 1–9, since at least 11 parameters will be incorporated in the mathematical control calculations even when only one of the front and rear pairs of the wheels are controlled about their braking, only a very rough discrete points simulation would be available even by using the most modern microcomputers employable for an automobile running behavior control from the view point of the convenience of construction and economy.

In view of such an estrangement between the self-closed mathematical analyses applicable only to the performance of a single tire and the complicated interrelations of the performances of the pairs of front and rear wheels in the actual running behavior controls of four wheeled vehicles, our colleagues have proposed in a co-pending U.S. patent application Ser. No. 09/282,416 filed by the same assignee as the present assignee to provide a device for controlling a running behavior of four wheeled vehicles which can utilize a self-closed mathematical performance analysis of a single wheel tire such as described above effectively for a running behavior control of four wheeled vehicles even by using a microcomputer of a limited capacity.

According to the prior proposition, the device for controlling a running behavior of a vehicle based upon a force-slip performance of a tire, the vehicle having a vehicle body, a pair of front wheels and a pair of rear wheels, and brake means for selectively applying a controlled braking force to at least either the front pair or the rear pair of the wheels bearing the tires, comprises:

first means for cyclically calculating by a minute cycle period longitudinal force and lateral force of each of the at least either the front pair or the rear pair of the wheels in reference to slip ratio thereof according to a mathematical tire model of a relationship therebetween, so as to obtain a first longitudinal force and a first lateral force corresponding to a first slip ratio and a second longitudinal force and a second lateral force corresponding to zero slip ratio;

second means for cyclically calculating by the minute cycle period longitudinal force, lateral force and yaw moment of the vehicle body based upon the longitudinal forces and the lateral forces of the at least either the front pair or the rear pair of the wheels, so as to obtain a first longitudinal force, a first lateral force and a first yaw moment of the vehicle body corresponding to the first longitudinal forces and the first lateral forces of the at least either the front pair or the rear pair of the wheels and a second longitudinal force, a second lateral force and a second yaw moment of the vehicle body corresponding to the second longitudinal forces and the second lateral forces of the at least either the front pair or the rear pair of the wheels;

third means for cyclically modifying by the minute cycle period the second longitudinal force, the second lateral force and the second yaw moment of the vehicle body calculated by the second means with a longitudinal force, a lateral force and a yaw moment corresponding to an output of an outside running behavior controller, so as to obtain a nominal longitudinal force, a nominal lateral force and a nominal yaw moment, respectively;

fourth means for cyclically calculating by the minute cycle period a difference between the nominal longitudinal force and the first longitudinal force, a difference between the nominal lateral force and the first lateral force and a difference between the nominal yaw moment and the first yaw moment;

fifth means for cyclically calculating by the minute cycle period differentials of the longitudinal and lateral forces of each of the at least either the front pair or the rear pair of the wheels on the basis of the slip ratio thereof according to the mathematical tire model;

sixth means for cyclically calculating by the minute cycle period differentials of the longitudinal force, lateral force and yaw moment of the vehicle body based upon differentials of the longitudinal and lateral forces of each of the at least either the front pair or the rear pair of the wheels on the basis of the slip ratio;

seventh means for cyclically calculating by the minute cycle period a difference in the longitudinal force, a difference in the lateral force and a difference in the yaw moment of the vehicle body based upon the differentials thereof;

eighth means for cyclically calculating by the minute cycle period a first difference between the difference in the longitudinal force calculated by the fourth means and the difference in the longitudinal force calculated by the seventh means, a second difference between the difference in the lateral force calculated by the fourth means and the differential-based difference in the lateral force calculated by the seventh means, and a third difference between the difference in the yaw moment calculated by the fourth means and the differential-based difference in the yaw moment calculated by the seventh means;

ninth means for calculating by the minute cycle period differences in the slip ratio of each of the at least either the front pair or the rear pair of the wheels which minimize a weighted sum of squares of the first, second and third differences; and tenth means for selectively operating the brake means to change the slip ratio of each of the at least either the front pair or the rear pair of the wheels according to the difference thereof calculated by the ninth means.

By the device of the above-mentioned construction, it is possible to execute a running behavior control of a four wheeled vehicle through mathematical control calculations based upon a mathematical tire model defining a relationship between longitudinal and lateral forces vs. slip ratio of each wheel such that the desired running behavior control of the vehicle is effectively accomplished with a minimum slip of at least a pair of front wheels or a pair of rear wheels to which a controlled braking is applied.

Since the running behavior control by the device according to the prior proposition is executed based upon a standard mathematical tire model, the control operation is continually effective even when the vehicle is running in such an operation range where the running behavior of the vehicle is so stabilized that some conventional running stability control devices adapted to be triggered by a certain parameter trespassing a threshold value do not yet operate.

On the other hand, in the modern electrically controlled brake systems such as those, for example, shown in co-pending U.S. patent application Ser. No. 09/365,222, there is a probability, improbable in the conventional hydraulic brake systems, that the brake of one of the wheels erroneously operates such that a braking force is uncontrollably applied to the wheel due to the incorporation of the solenoid valves. When this happens, the running course of the vehicle will be much affected unless the driver is highly skilled in the driving.

SUMMARY OF THE INVENTION

In view of such a problem bound with the modern electrically controlled brake systems which are indeed in their brain part constructed by a software calculation system of a micro-computer, it is contemplated to solve the problem at high effectiveness, particularly when the running behavior of the vehicle is controlled by such a highly computerized device as proposed by the above-mentioned prior proposition, by a modification of the control calculations against a malfunction of such a solenoid valve as incorporated in the electrically controlled brake systems.

Therefore, it is a primary object of the present invention to provide a device for controlling a running behavior of a vehicle by a mathematical tire model with a mathematical compensation for a malfunction of the hardware part of the brake system.

According to the present invention, the above-mentioned primary object is accomplished by a device for controlling a running behavior of a vehicle based upon a force-slip performance of a tire, the vehicle having a vehicle body, a pair of front wheels and a pair of rear wheels, brake means for selectively applying a controlled braking force to each of the front pair and the rear pair of the wheels bearing the tires, and means for detecting a braking force applied to each of the front and rear pairs of wheels adapted to be applied with the controlled braking force, comprises:

first means for cyclically calculating by a minute cycle period longitudinal force and lateral force of each of the front and rear pairs of wheels in reference to slip ratio thereof according to a mathematical tire model of a relationship therebetween, so as to obtain a first longitudinal force and a first lateral force corresponding to a first slip ratio and a second longitudinal force and a second lateral force corresponding to zero slip ratio;

second means for cyclically calculating by the minute cycle period longitudinal force, lateral force and yaw moment of the vehicle body based upon the longitudinal forces and the lateral forces of the front pair and rear pairs of wheels, so as to obtain a first longitudinal force, a first lateral force and a first yaw moment of the vehicle body corresponding to the first longitudinal forces and the first lateral forces of the front and rear pairs of wheels and a second longitudinal force, a second lateral force and a second yaw moment of the vehicle body corresponding to the second longitudinal forces and the second lateral forces of the front and rear pairs of the wheels;

third means for cyclically modifying by the minute cycle period the second longitudinal force, the second lateral force and the second yaw moment of the vehicle body calculated by the second means with a longitudinal force, a lateral force and a yaw moment corresponding to an output of an outside running behavior controller, so as to obtain a nominal longitudinal force, a nominal lateral force and a nominal yaw moment, respectively;

fourth means for cyclically calculating by the minute cycle period a difference between the nominal longitudinal force and the first longitudinal force, a difference between the nominal lateral force and the first lateral force and a difference between the nominal yaw moment and the first yaw moment;

fifth means for cyclically calculating by the minute cycle period differentials of the longitudinal and lateral forces of each of the front and rear pairs of wheels on the basis of the slip ratio thereof according to the mathematical tire model;

sixth means for cyclically calculating by the minute cycle period differentials of the longitudinal force, lateral force and yaw moment of the vehicle body based upon differentials of the longitudinal and lateral forces of each of the front and rear pairs of wheels on the basis of the slip ratio;

seventh means for cyclically calculating by the minute cycle period a difference in the longitudinal force, a difference in the lateral force and a difference in the yaw moment of the vehicle body based upon the differentials thereof;

eighth means for cyclically calculating by the minute cycle period a first difference between the difference in the longitudinal force calculated by the fourth means and the difference in the longitudinal force calculated by the seventh means, a second difference between the difference in the lateral force calculated by the fourth means and the difference in the lateral force calculated by the seventh means, and a third difference between the difference in the yaw moment calculated by the fourth means and the difference in the yaw moment calculated by the seventh means;

ninth means for calculating by the minute cycle period differences in the slip ratio of each of the front and rear pairs of wheels which minimize a weighted sum of squares of the first, second and third differences; and tenth means for selectively operating the brake means to change the slip ratio of each of the front and rear pairs of wheels according to the difference thereof calculated by the ninth means, wherein the third means further cyclically modify the nominal longitudinal force and the nominal yaw moment to be decreased as much as an additional longitudinal force and an additional yaw moment, respectively, the additional longitudinal force and the additional yaw moment corresponding respectively to a sum of a longitudinal force and a sum of a yaw moment generated in the vehicle by a difference between an uncontrollable braking force detected by the braking force detection means with respect to each of the front and rear pairs of wheels and a braking force to be applied thereto according to the change of the slip ratio thereof effected by the tenth means.

As in the above-mentioned prior proposition, the above-mentioned device may further be modified such that it further comprises:

eleventh means for cyclically calculating by the minute cycle period a weighted sum of a square of each of the differences in the slip ratio calculated by the ninth means;

wherein the ninth means are modified to calculate the differences in the slip ratio so that a sum of the weighted sum calculated by the ninth means and the weighted sum calculated by the eleventh means is minimized.

In the same manner, the above-mentioned device may further be modified such that it further comprises:

twelfth means for cyclically calculating by the minute cycle period a weighted sum of a square of each of respective sums of the slip ratio and the change thereof calculated by the ninth means;

wherein the ninth means are modified to calculate the differences in the slip ratio so that a sum of the weighted sum calculated by the ninth means and the weighted sum calculated by the twelfth means is minimized.

In this case, the device may further be modified such that the ninth means are modified to calculate the differences in the slip ratio so that a sum of the weighted sum calculated by the ninth means, the weighted sum calculated by the eleventh means and the weighted sum calculated by the twelfth means is minimized.

Further, the device may further be modified such that the third means modify the second longitudinal force, the second lateral force and the second yaw moment of the vehicle body calculated by the second means with the longitudinal force, the lateral force and the yaw moment corresponding to the output of the outside running behavior controller, so as to obtain the nominal longitudinal force, the nominal lateral force and the nominal yaw moment, respectively, by adding the longitudinal force, the lateral force and the yaw moment corresponding to the output of the outside running behavior controller to the second longitudinal force, the second lateral force and the second yaw moment, respectively.

In this case, the third means may substantially cancel the lateral force corresponding to the output of the outside running behavior controller in obtaining the nominal lateral force.

Further, the device may further be modified such that the ninth means apply a variable weighting factor on each of the difference in the slip ratio of each of the front pair of wheels calculated thereby before outputting the calculated slip ratio difference such that a slip ratio difference applied with a larger weighting factor affects less in the running behavior control than a slip ratio difference applied with a smaller weighting factor, the weighting factor being varied such that, when the nominal yaw moment calculated by the third means is directed to assist a turn of the vehicle, the weighting factor on the slip ratio difference of one of the pair of front wheels serving at the inside of a turn is made larger.

Still further, the device may further be modified such that the tenth means are adapted to cancel a braking of the rear wheels by overriding the difference of the slip ratio calculated by the ninth means when the yaw rate of the vehicle has changed its direction from a first direction conforming to a turning of the vehicle to a second direction opposite to the first direction during a turn running of the vehicle.

BRIEF DESCRIPTION OF THE DRAWINGS

In the accompanying drawings.

DESCRIPTION OF THE PREFERRED EMBODIMENT

In the following, the present invention will be described in more detail with respect to a preferred embodiment thereof with reference to the accompanying drawings.

Figure 1:
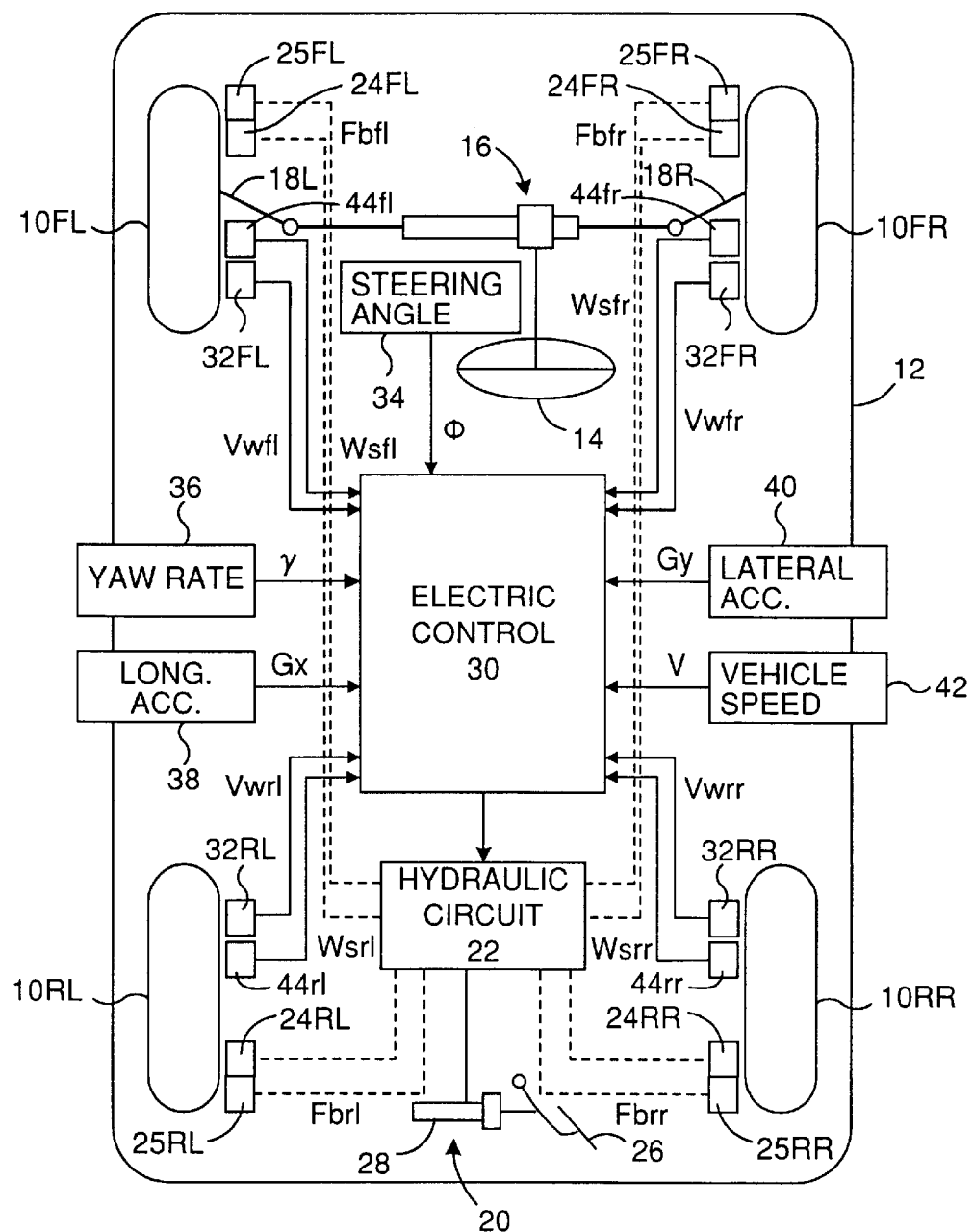
FIG. 1 is a diagrammatical view showing a four wheeled vehicle having a steering system, a brake system and a control system in which an embodiment of the present invention herein shown is incorporated.

Referring to FIG. 1 showing diagrammatically a vehicle in which an embodiment of the vehicle running behavior control device according to the present invention is incorporated. The vehicle has a vehicle body 12, and front right wheel 10FR, front left wheel 10FL, rear right wheel 10RR and rear left wheel 10RL supporting the vehicle body 12 via respective suspension means not shown in the figure. The front right and front left wheels 10FR and 10FL are steered by a rack-and-pinion type power steering means 16 according to rotations of a steering wheel 14 by a driver via a pair of tie rods 18R and 18L, respectively.

A brake system generally designated by 20 includes a hydraulic circuit means 22, a brake pedal 26 adapted to be depressed by the driver, a master cylinder 28 for supplying a master cylinder pressure to the hydraulic circuit means 22 according to the depression of the brake pedal by the driver, and wheel cylinders 24FR, 24FL, 24RR and 24RL each adapted to apply a braking force to each corresponding one of the front right, front left, rear right and rear left wheels according to a supply of a hydraulic pressure thereto from the hydraulic circuit means 22. The hydraulic pressure in each of the wheel cylinders 24FR, 24FL, 24RR and 24RL is detected by each of pressure sensors 25Fr, 25FL, 25RR and 25RL, respectively.

The hydraulic circuit means 22 are electrically controlled by electric control means 30 incorporating a microcomputer which may be of an ordinary type including a central processor unit, a read only memory, a random access memory, input and output port means and a common bus interconnecting these elements.

The electric control means 30 are supplied with a signal indicating steering angle $\phi$ inputted to the lack-and-pinion type power steering means 16 from the steeling wheel 14 according to a rotation thereof by the driver from a steering angle sensor 34, a signal indicating yaw rate $\gamma$ of the vehicle body from a yaw rate sensor 36, a signal indicating longitudinal acceleration Gx of the vehicle body from a longitudinal acceleration sensor 38, a signal indicating lateral acceleration Gy of the vehicle body from a lateral acceleration sensor 40, a signal indicating vehicle speed V from a vehicle speed sensor 42, signals indicating vehicle wheel speeds Vwi of the front right, front left, rear right and rear left wheels from wheel speed sensors 32FR, 32FL, 32RR and 32RL, respectively, signals indicating static loads Wsi of the front right, front left, rear right and rear left wheels from static load sensors 44*fr*, 44*fl*, 44*rr* and 44*rl*, respectively, and signals indicating hydraulic pressures Fbfr, Fbrl, Fbrr and Fbrl in the wheel cylinders 24FR, 24FL, 24RR and 24RL from the pressure sensors 25FR, 25FL, 25RR and 25RL, respectively, and conduct control calculations according to the programs stored in the read only memory based upon the parameters supplied by the signals in the manner described in detail hereinbelow with reference to the flowchart shown in FIG. 2 for stabilizing the movement of the vehicle, then outputting control signals toward the hydraulic circuit means 22 for executing pertinent braking of wheels for the vehicle running behavior control.

Figure 2:
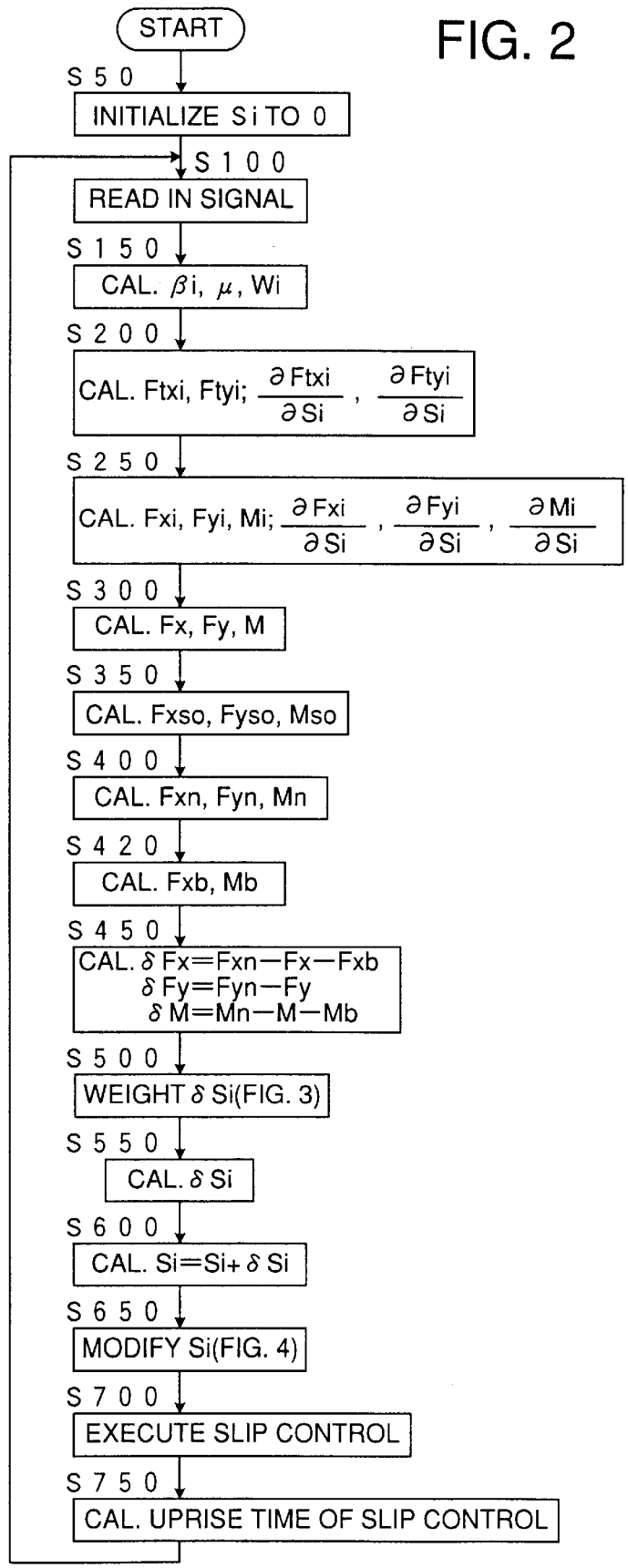
FIG. 2 is a flowchart showing a main routine of the control operation of the embodiment of the present invention.

The vehicle running behavior control device of the present invention will be described hereinbelow in the form of its control operation of an embodiment thereof by referring to the flowchart of FIG. 2 showing the main routine of the control operation. The control according to the main routine is started by a closure of an ignition switch not shown in the figure and cyclically repeated therethrough during the operation of the vehicle. Although the operation of the embodiment device of the present invention is generally described so as to selectively apply a controlled braking force to both of the front pair and the rear pair of the wheels, the device according to the present invention may be so constructed as to selectively apply a controlled braking force to only the front pair or the rear pair of the wheels.

First, in step 50, slip ratios Si of the respective wheels, which are parameters to be controlled according to the present invention, are reset to zero for each initial starting.

In step 100, the signals described with respect to FIG. 1 are read in.

In step 150, slip angles $\beta i$, i.e. $\beta r$ and $\beta f$ of the rear and front wheels (as a pair, for convenience), function coefficient $\mu$ between the tire and the road surface and vertical load Wi on each of the wheels are calculated as follows:

First, slip angle $\beta$ of the vehicle body is calculated according to a conventional method such that first a lateral slip acceleration dVy/dt is calculated as a difference between the lateral acceleration Gy detected by the lateral acceleration sensor 40 and a product of the vehicle speed V detected by the vehicle speed sensor 42 and the yaw rate $\gamma$ detected by the yaw rate sensor 36, such as dVy/dt=Gy−Vy, then the lateral slip acceleration is integrated on time base to obtain a lateral slip velocity Vy, and then the lateral slip velocity Vy is divided by longitudinal vehicle speed Vx which may be substituted for by the vehicle speed V detected by the vehicle speed sensor 42, so as to provide $\beta$=Vy/Vx.

Then, assuming that the vehicle is an ordinary front steered vehicle, by denoting the distance between the center of gravity of the vehicle body and the axis of the rear axle as Lr, the slip angle βr of the rear wheels is calculated based upon the slip angle β of the vehicle body, the yaw rate γ and the vehicle speed V as follows:

$$\beta r = \beta - Lr\gamma/V \tag{10}$$

When the slip angle βr becomes larger, the magnitude of the tire slip required to generate a certain desired magnitude of the longitudinal force becomes correspondingly larger, against the general desirableness of the running behavior control to be accomplished by a minimum braking. Therefore, it is desirable that the value of the slip angle βr of the rear wheels thus calculated is modified to be within an appropriate range such as $-\beta rc \leq \beta r \leq \beta rc$, provided that the rear wheels are non-steered wheels.

Next, by denoting the distance between the center of gravity of the vehicle body and the axis of the front axle as Lf, the slip angle βf of the front wheels (also as a pair, for convenience) is calculated based upon steering angle φf converted from turn angle φ of the steering wheel, the slip angle β of the vehicle body, the yaw rate γ and the vehicle speed V as follows:

$$\beta f = -\phi f + \beta + Lf\gamma/V \tag{11}$$

Further, friction coefficient μ between the tire and the road surface is calculated based upon the longitudinal and lateral accelerations Gx and Gy and the gravitational acceleration g as follows:

$$\mu = \sqrt{Gx^2 + Gy^2}/g \tag{12}$$

Further, vertical load Wi on each of the wheels is calculated based upon Wsi detected by the static vertical load sensors 44i, with a modification of a shift of load between the right and left wheels due to the lateral acceleration Gy and a shift of load between the front and rear wheels due to the longitudinal acceleration Gx.

In step 200, the longitudinal force Ftxi and the lateral force Ftyi of each of the four wheels are calculated according to the above-mentioned equations 1 and 2 or 3 and 4 with incorporation of the equations 5–9, such that the equations 1 and 2 are used when ξi calculated according to the equation 9 is positive (or zero, for convenience), while the equations 3 and 4 are used when ξi is negative.

Further, in this step, partial differentials of Ftxi and Ftyi against Si are calculated for a later use such as:

$$\frac{\partial Ftxi}{\partial Si} \text{ and } \frac{\partial Ftyi}{\partial Si}$$

In step 250, shares Fxi by respective wheels of the longitudinal force, shares Fyi by respective wheels of the lateral force and shares Mi by respective wheels of the yaw moment to act at the vehicle body due to the longitudinal forces Ftxi and the lateral forces Ftyi of the four wheels are calculated based upon a mathematical tire model such as defined by equations 1–9 as follows:

$$\begin{bmatrix} Fxfr \\ Fyfr \end{bmatrix} = T(\phi f) \begin{bmatrix} Ftxfr \\ Ftyfr \end{bmatrix} \tag{13}$$

$$Mfr = \begin{bmatrix} \frac{TR}{2} & Lf \end{bmatrix} \begin{bmatrix} Fxfr \\ Fyfr \end{bmatrix} \tag{14}$$

$$\begin{bmatrix} Fxfl \\ Fyfl \end{bmatrix} = T(\phi f) \begin{bmatrix} Ftxfl \\ Ftyfl \end{bmatrix} \tag{15}$$

$$Mfl = \begin{bmatrix} -\frac{Tr}{2} & Lf \end{bmatrix} \begin{bmatrix} Fxfl \\ Fyfl \end{bmatrix} \tag{16}$$

$$\begin{bmatrix} Fxrr \\ Fyrr \end{bmatrix} = T(\phi r) \begin{bmatrix} Ftxrr \\ Ftyrr \end{bmatrix} \tag{17}$$

$$Mrr = \begin{bmatrix} \frac{Tr}{2} & -Lr \end{bmatrix} \begin{bmatrix} Fxrr \\ Fyrr \end{bmatrix} \tag{18}$$

$$\begin{bmatrix} Fxrl \\ Fyrl \end{bmatrix} = T(\phi r) \begin{bmatrix} Ftxrl \\ Ftyrl \end{bmatrix} \tag{19}$$

$$Mrl = \begin{bmatrix} -\frac{Tr}{2} & -Lr \end{bmatrix} \begin{bmatrix} Fxrl \\ Fyrl \end{bmatrix} \tag{20}$$

wherein Tr is the wheel track and $$T(\phi f) = \begin{bmatrix} \cos\phi f & -\sin\phi f \\ \sin\phi f & \cos\phi f \end{bmatrix} \tag{21}$$

$$T(\phi r) = \begin{bmatrix} \cos\phi r & -\sin\phi r \\ \sin\phi r & \cos\phi r \end{bmatrix} \tag{22}$$

Further, in this step, a rate of change of each of Fxi, Fyi and Mi due to a change of a corresponding Si, i.e. partial differential of each of Fxi, Fyi and Mi against Si is calculated based upon the tire model as follows:

$$\begin{bmatrix} \frac{\partial Fxfr}{\partial Sfr} \\ \frac{\partial Fyfr}{\partial Sfr} \end{bmatrix} = T(\phi f) \begin{bmatrix} \frac{\partial Ftxfr}{\partial Sfr} \\ \frac{\partial Ftyfr}{\partial Sfr} \end{bmatrix} \tag{23}$$

$$\frac{\partial Mfr}{\partial Sfr} = \begin{bmatrix} \frac{Tr}{2} & Lf \end{bmatrix} \begin{bmatrix} \frac{\partial FxfrSfr}{\partial Fyfr} \\ \frac{\partial Fyfr}{\partial Sfr} \end{bmatrix} \tag{24}$$

$$\begin{bmatrix} \frac{\partial Fxfl}{\partial Sfl} \\ \frac{\partial Fyfl}{\partial Sfl} \end{bmatrix} = T(\phi f) \begin{bmatrix} \frac{\partial Ftxfl}{\partial Sfl} \\ \frac{\partial Ftyfl}{\partial Sfl} \end{bmatrix} \tag{25}$$

$$\frac{\partial Mfl}{\partial Sfl} = \begin{bmatrix} -\frac{Tr}{2} & Lf \end{bmatrix} \begin{bmatrix} \frac{\partial Fxfl}{\partial Sfl} \\ \frac{\partial Fyfl}{\partial Sfl} \end{bmatrix} \tag{26}$$

$$\begin{bmatrix} \frac{\partial Fxrr}{\partial Srr} \\ \frac{\partial Fyrr}{\partial Srr} \end{bmatrix} = T(\phi r) \begin{bmatrix} \frac{\partial Ftxrr}{\partial Srr} \\ \frac{\partial Ftyrr}{\partial Srr} \end{bmatrix} \tag{27}$$

$$\frac{\partial Mrr}{\partial Srr} = \begin{bmatrix} \frac{Tr}{2} & -Lr \end{bmatrix} \begin{bmatrix} \frac{\partial Fxrr}{\partial Sr} \\ \frac{\partial Fyrr}{\partial Srr} \end{bmatrix} \tag{28}$$

-continued $$\begin{bmatrix} \frac{\partial Fxrl}{\partial Srl} \\ \frac{\partial Fyrl}{\partial Srl} \end{bmatrix} = T(\phi r) \begin{bmatrix} \frac{\partial Ftxrl}{\partial Srl} \\ \frac{\partial Ftyrl}{\partial Srl} \end{bmatrix} \quad (29)$$

$$\frac{\partial Mrl}{\partial Srl} = \begin{bmatrix} -\frac{Tr}{2} & -Lr \end{bmatrix} \begin{bmatrix} \frac{\partial Fxrl}{\partial Srl} \\ \frac{\partial Fyrl}{\partial Srl} \end{bmatrix} \quad (30)$$

Therefore, the differences dFx, dFy and dM of longitudinal force, lateral force and yaw moment, respectively, of the vehicle body due to the partial differential of the longitudinal and lateral forces of each wheel are calculated based upon the three wheels at the most, excluding either one of the front wheels, as follows:

$$\begin{bmatrix} dFx \\ dFy \\ dM \end{bmatrix} = \begin{bmatrix} \frac{\partial Fxfr}{\partial Sfr} & \frac{\partial Fxfl}{\partial Sfl} & \frac{\partial Fxrr}{\partial Srr} & \frac{\partial Fxrl}{\partial Srl} \\ \frac{\partial Fyfr}{\partial Sfr} & \frac{\partial Fyfl}{\partial Sfl} & \frac{\partial Fyrr}{\partial Srr} & \frac{\partial Fyrl}{\partial Srl} \\ \frac{\partial Mfr}{\partial Sfr} & \frac{\partial Mfl}{\partial Sfl} & \frac{\partial Mrr}{\partial Srr} & \frac{\partial Mrl}{\partial Srl} \end{bmatrix} \begin{bmatrix} dSfr \\ dSrr \\ dSrr \\ dSrl \end{bmatrix} = Jds \quad (31)$$

In step 300, Fxi, Fyi and Mi are integrated to provide longitudinal force Fx, lateral force Fy and yaw moment M of the vehicle body calculated as a function of the slip ratios Si as follows:

$$\begin{bmatrix} Fx \\ Fy \\ M \end{bmatrix} = \begin{bmatrix} Fxfr \\ Fyfr \\ Mfr \end{bmatrix} + \begin{bmatrix} Fxfl \\ Fyfl \\ Mfl \end{bmatrix} + \begin{bmatrix} Fxrr \\ Fyrr \\ Mrr \end{bmatrix} + \begin{bmatrix} Fxrl \\ Fyrl \\ Mrl \end{bmatrix} \quad (32)$$

In step 350, according to the same process as step 200, except that the slip ratios Si are all assumed zero, longitudinal force Ftxiso and lateral force Ftyiso of each of the four wheels are calculated as a reference tire model conditioned by zero slip, then shares Fxiso by the respective wheels of the longitudinal force, shares Fyiso by the respective wheels of the lateral force and shares Miso by the respective wheels of the yaw moment to act at the vehicle body due to the longitudinal forces Ftxiso and the lateral forces Ftyiso of the four wheels are calculated, and then Fxiso, Fyiso and Miso are integrated to provide longitudinal force Fxso, lateral force Fyso and yaw moment Mso of the vehicle body according to the same tire model operating at zero slip, as follows:

$$\begin{bmatrix} Fxso \\ Fyso \\ Mso \end{bmatrix} = \begin{bmatrix} Fxfrso \\ Fyfrso \\ Mfrso \end{bmatrix} + \begin{bmatrix} Fxflso \\ Fyflso \\ Mflso \end{bmatrix} + \begin{bmatrix} Fxrrso \\ Fyrrso \\ Mrrso \end{bmatrix} + \begin{bmatrix} Fxrlso \\ Fyrlso \\ Mrlso \end{bmatrix} \quad (33)$$

The longitudinal force Fxso, the lateral force Fyso and the yaw moment Mso of the vehicle body will be herein called a zero slip longitudinal force, a zero slip lateral force and a zero slip yaw moment.

In step 400, a nominal longitudinal force Fxt, a nominal lateral force Fyt and a nominal yaw moment Mn are calculated based upon Fxso, Fyso and Mso and a running behavior control input from an outside running behavior controller. The running behavior controller herein referred to as the outside controller is already known in various types, including those for controlling various turning behaviors of the vehicles while suppressing a driftout or a spin of the vehicles. It is assumed that the device of the present invention operates under an input from such an outside running stability controller, the input being generally a combination of a longitudinal force Fxm, a lateral force Fym and a yaw moment Mm applied to vehicle body.

The longitudinal force Fxm may be considered as a force for decelerating the vehicle for the purpose of decreasing the centrifugal force against a drifting out, while the yaw moment Mm may be considered as a yaw moment generated by a balance between the braking force applied to the leftside wheel or wheels and the braking force applied to the rightside wheel or wheels. In fact, no lateral force will need be considered as a component of such an input, particularly in connection with the present invention which operates based upon a selective braking of the wheels. Therefore, Fym may be constantly set to zero.

Such a longitudinal force Fxm may be generated by an outside controller to control a driftout, for example, as follows:

First, a standard yaw rate γc of the vehicle body is calculated based upon the vehicle speed V and the steering angle φ, denoting the wheel base of the vehicle as H, assuming an appropriate factor Kh, as follows:

$$\gamma c = V\phi/(1+KhV^2)H \quad (34)$$

Then, γc is modified to be adapted to a transient performance according to a time constant T and the Laplace operator s, as follows:

$$\gamma t = \gamma c/(1+Ts) \quad (35)$$

Then, a parameter Dv indicating a tendency of the driftout of the vehicle is calculated as follows:

$$Dv = (\gamma t - \gamma) \quad (36)$$

or $$Dv = H(\gamma t - \gamma) \quad (37)$$

Then, by judging the turning direction of the vehicle by the sign of the yaw rate γ, the parameter Dv is finalized to Dv when Dv is positive while the vehicle is making a left turn, or Dv is negative while the vehicle is making a right turn. The parameter Dv is made zero when Dv is negative while the vehicle is making a left turn, or Dv is positive while the vehicle is making a right turn.

Figure 12:
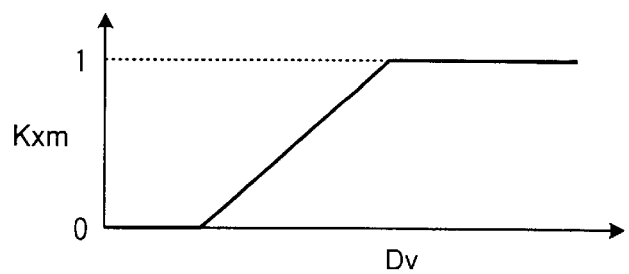
FIG. 12 is a map to be referred to in step 400 to obtain a factor for estimating a longitudinal force to be applied to the vehicle body for a yaw rate control.

Then, by looking up a map such as shown in FIG. 12, a factor Kxm for estimating the force Fxm is read out against the parameter Dv. Then the longitudinal force Fxm is calculated by the factor Kxm, mass Qb of the vehicle body and the gravitational acceleration g as follows:

$$Fxm = Kxm\, Qb\, g \quad (38)$$

By the longitudinal force Fxm being applied to, the vehicle is decelerated so that a driftout is suppressed.

On the other hand, also as an example, a spin will be suppressed such that, based upon the yaw rate γt calculated as by equation 35, assuming in appropriate factor Kmm, a slip angle βt of the vehicle body is calculated with the mass Qb of the vehicle body and the vehicle speed V, as follows:

$$\beta t = Kmm\, Qb\, \gamma t\, V \quad (39)$$

Then, the yaw moment Mm is calculated by assuming appropriate factors Km1 and Km2 as follows:

$$Mm = Km1(\beta - \beta t) + Km2(d\beta/dt - d\beta t/dt) \quad (40)$$

By the yaw moment Mm being applied to, the vehicle is suppressed from spinning.

In any event, receiving a control input in the form of longitudinal force Fxm and/or yaw moment Mm from an outside running behavior controller, [Fxso, Fyso, Mso] are modified by [Fxm, 0, Mm] to produce nominal Fxn, Fyn and Mn as follows:

$$\begin{bmatrix} Fxn \\ Fyn \\ Mn \end{bmatrix} = \begin{bmatrix} Fxm \\ 0 \\ Mm \end{bmatrix} + \begin{bmatrix} Fxso \\ Fyso \\ Mso \end{bmatrix} \tag{41}$$

Figure 3:
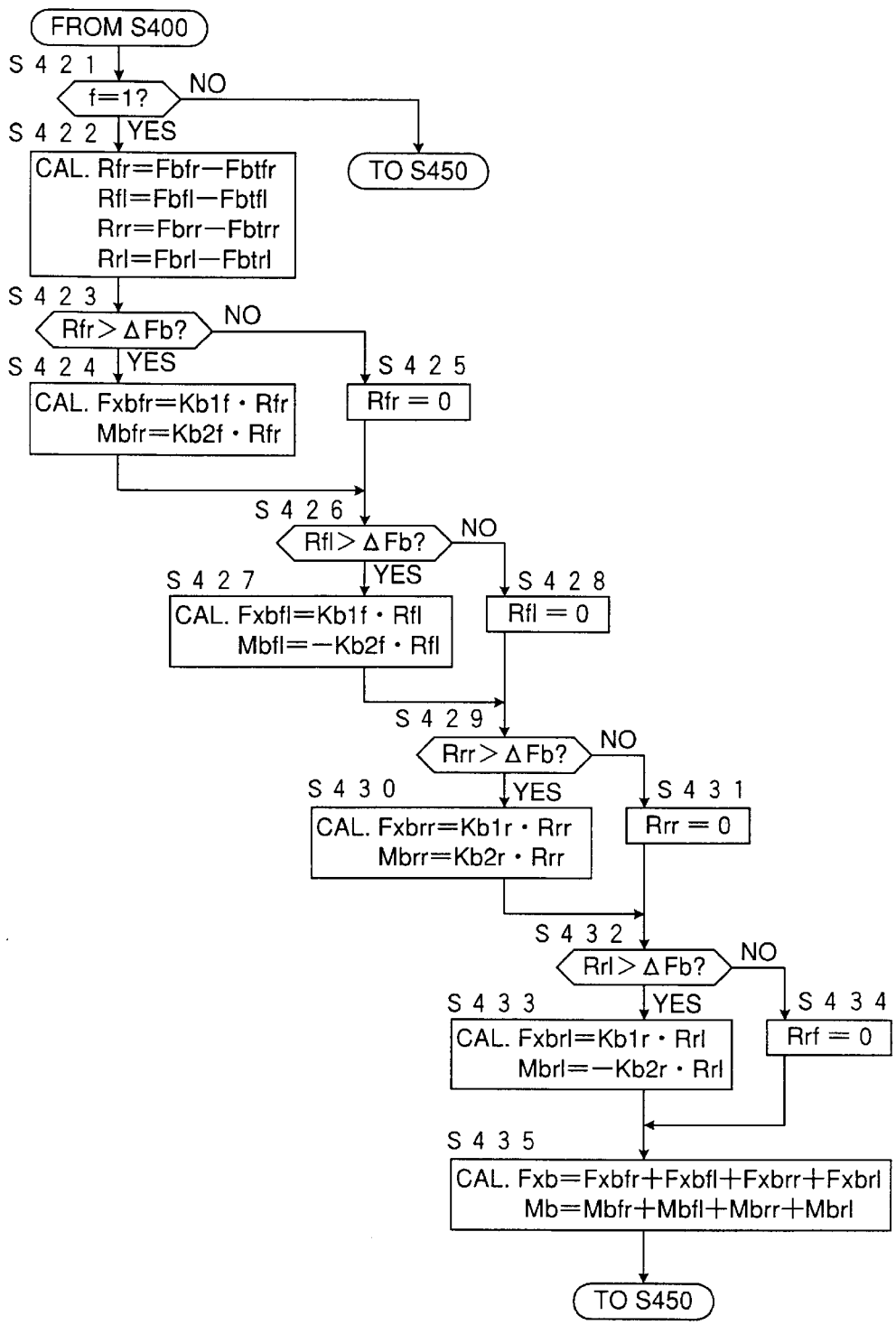
FIG. 3 a flowchart showing a subroutine of the control operation executed in step 420 of the main routine.

In step 420, a longitudinal force Fbx and a yaw moment Mb applied to the vehicle body, if any one of the front pair and the rear pair of wheels is applied with an uncontrollable braking force due to a malfunction of the brake system, are calculated according to a subroutine such as shown in FIG. 3.

Referring to FIG. 3, in step 421, it is judged if flag f is 1. The flag f, initialized to zero at each time start of the behavior control, is set to 1 when such a predetermined time has lapsed after the slip control of the wheels by braking in step 700 described hereinbelow was started as to ensure that each of the wheel cylinders 24FR, 24FL, 24RR and 24RL has attained a hydraulic pressure instructed by the electric control means 30 according to the behavior control calculations. When the answer is yes, the control proceeds to step 422, while when the answer is no, the control proceeds to step 450 substantially bypassing this subroutine.

In step 422, differences Ri (i=fr, fl, rr and rl) between the hydraulic pressure values Fbi (i=fr, fl, rr and rl) detected by the pressure sensors 25FR, 25RL, 25RR and 25RL, respectively, and target hydraulic pressure values Fbti (i=fr, fl, rr and rl) instructed by the electric control means according to the behavior control calculations are calculated.

In step 423, it is judged if the Rfr regarding the front right wheel is larger than a predetermined threshold value ΔFb indicative of a malfunction of a part of the brake system particular to each wheel such as the inlet and outlet solenoid valves for each wheel shown in the above-mentioned U.S. patent application Ser. No. 09/365,222. When the answer is yes, the control proceeds to step 424, while when the answer is no, the control proceeds to step 425.

In step 424, a longitudinal force Fxbfr and a yaw moment Mbfr applied to the vehicle body by the uncontrollable braking force generated by the wheel cylinder 24FR are calculated based upon the difference Rfr such as Fxbfr=Kb1f·Rfr and Mbfr=Kb2f·Rfr, wherein Kb1f and Kb2f are factors for converting a longitudinal braking force acting at the front light wheel to corresponding longitudinal force and yaw moment applied to the vehicle body, respectively. In step 425, Rfr is reset to zero. (Since the yaw moment is deemed positive when it is directed counter-clockwise, Kb2f is indeed a negative value.)

In steps 426, 427 and 428, the same processes as in steps 423, 424 and 425 are executed with respect to the front left wheel so that corresponding values Fxbfl and Mbfl are obtained or Rfl is reset to zero with regard to the front left wheel, by using, however, the factor Kb2f in the sign opposite to that for the right side wheel, i.e. as −Kb2f in order to adjust the turning direction of the yaw moment.

Similarly, in steps 429, 430 and 431, the same processes as in steps 423, 424 and 425 are executed with respect to the rear right wheel so that corresponding values Fxbrr and Mbrr are obtained or Rrr is reset to zero with regard to the front left wheel, by using similar factors Kb1r and Kb2r for converting a longitudinal braking force acting at the rear right wheel to corresponding longitudinal force and yaw moment applied to the vehicle body, respectively.

Then, in steps 432, 433 and 434, the same processes as in steps 429, 430 and 431 are executed with respect to the rear left wheel by using factors Kb1r and −Kb2r so that corresponding values Fxbrl and Mbrl are obtained or Rrl is reset to zero with regard to the rear left wheel.

In step 435, the values of Fxb and Mb are each calculated as a sum of Fxbfr, Fxbfl, Fxbrr and Fxbrl, or Mbfr, Mbrl, Mbrr and Mbrl, respectively. Then the control proceeds to step 450.

In step 450, differences of the nominal Fxt, Fyt and Mn from the actual Fx, Fy and M are calculated, by incorporating Fxb and Mb (both being zero as initialized to zero at each time start of the behavior control when there is no malfunction in the brake system for each wheel) as follow:

$$\Delta = \begin{bmatrix} \delta Fx \\ \delta Fy \\ \delta M \end{bmatrix} = \begin{bmatrix} Fxn - Fx - Fxb \\ Fyn - Fy \\ Mn - M - Mb \end{bmatrix} \tag{42}$$

The control conducted by the device according to the present invention is to approach the thus calculated [δFx, δFy, δM] to [dFx, dFy, dM] based upon the differentiation of the mathematical tire model by the slip ratio at each of the wheels through a cyclic convergent calculation of the difference in the slip ratio. Of course, it is very difficult to mathematically solve such a set of simultaneous equations as δFx=dFx, δFy=dFy and δM=dM. Therefore, it is contemplated to minimize the value of L such as defined below:

$$L = E^T W_f E + \delta S^T W_{ds} \delta S + (S + \delta S)^T W_s (S + \delta S) \tag{43}$$

wherein $$E = \begin{bmatrix} \delta Fx - dFx \\ \delta Fy - dFy \\ \delta M - dM \end{bmatrix} \tag{44}$$

$(E^T = [\delta Fx - dFx, \delta Fy - dFy, \delta M - dM]$
The same with others.)

$$W_f = \begin{bmatrix} W_{Fx} & 0 & 0 \\ 0 & W_{Fy} & 0 \\ 0 & 0 & W_M \end{bmatrix} \tag{45}$$

$$\delta S = \begin{bmatrix} \delta Sfr \text{ or } \delta Sfl \\ \delta Srr \\ \delta Srl \end{bmatrix} \tag{46}$$

$$W_{ds} = \begin{bmatrix} W_{dsfr} \text{ or } W_{dSfl} & 0 & 0 \\ 0 & W_{dsrr} & 0 \\ 0 & 0 & W_{dsrr} \end{bmatrix} \tag{47}$$

$$S = \begin{bmatrix} Sfr \text{ or } Sfl \\ Srr \\ Srl \end{bmatrix} \tag{48}$$

$$W_s = \begin{bmatrix} W_{sfr} \text{ or } W_{srl} & 0 & 0 \\ 0 & W_{srr} & 0 \\ 0 & 0 & W_{srl} \end{bmatrix} \tag{49}$$

In equation 43, the first term on the right side is a sum of weighted squares of the differences δFx−dFx, δFy−dFy and δMδdM. As a first approach, if this term is minimized, it is duly expected that the vehicle is controlled to follow the control by the outside controller at an optimum operating condition of the brake means that they are actuated generally at a necessary minimum.

In this connection, the second term on the light side of equation 43 is provided to restrict the width of change of δS, so that the calculations do not diverge. The third term on the right side of equation 43 is provided to restrict the absolute value of the slip ratio S, so that a uniform distribution of the slip ratio to the respective wheels is ensured.

Figure 4:
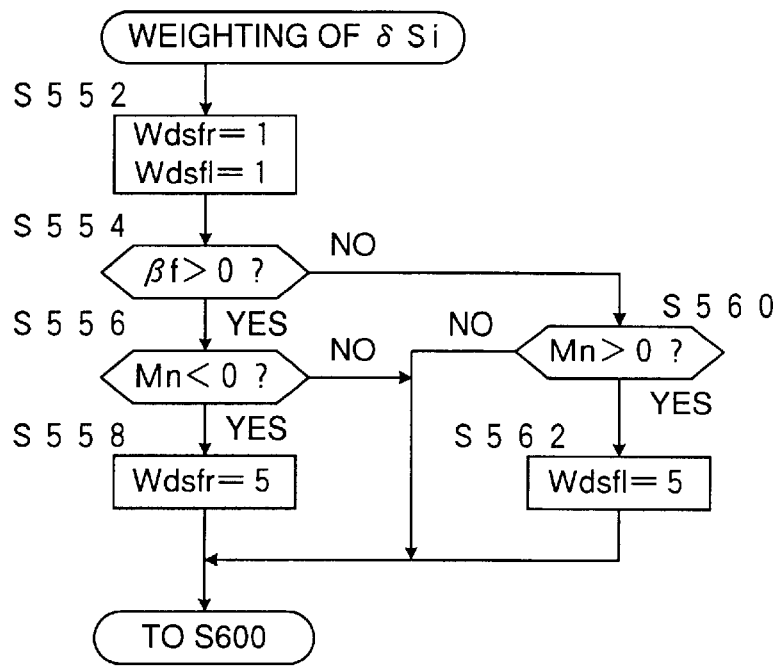
FIG. 4 is a flowchart showing a subroutine of the control operation executed in step 550 of the main routine.
Figure 13A:
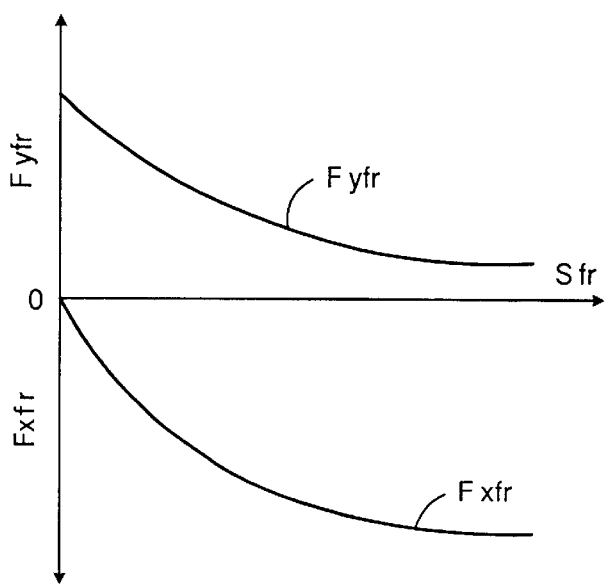
FIG. 13A is a graph showing a general relationship between the slip ratio of a front wheel and the longitudinal or lateral force applied to the vehicle body corresponding to the slip ratio.
Figure 13B:
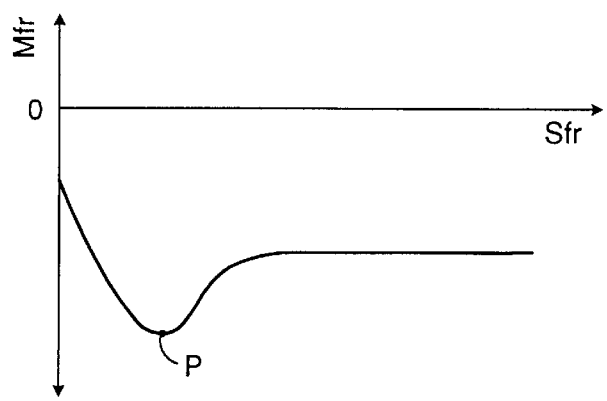
FIG. 13B is a graph showing a general relationship between the slip ratio of a front wheel and the yaw moment applied to the vehicle body corresponding to the slip ratio.

In step 500, δSfr and δSfl of δSi are processed for a modification of the weighting factor Wdsfr or Wdsfl of the front right wheel or the front left wheel such as shown by a flowchart of FIG. 4. The purpose of the processing according to the flowchart of FIG. 4 is as follows:

When the slip ratio Sfr, for example, increases, the longitudinal force Fxfr increases toward rearward, while the lateral force Fyfr decreases, both monotonously in any event, as shown in FIG. 13A. On the other hand, assuming that the vehicle is now making a right turn, when the front right wheel is braked for assisting the turn, the vehicle body is first applied with a yaw moment for a right turn about the front right wheel, thus effectively applying a turn assisting yaw moment to the vehicle body. In this case, the turn assist yaw moment generated around the front right wheel first increases along with increase of the braking force, but soon the lateral tire grip force available at the front right wheel starts to decrease due to the limited radius of the friction circle, so that the front right wheel starts to slip toward outside of the turn, thereby canceling the turn assist yaw moment first generated. Therefore, the yaw moment Mfr available for the vehicle body according to Sfr first increases but soon reaches a peak point P and then decreases as shown in FIG. 13B. (It is the general practice that the yaw moment is made positive when it turns the vehicle body counterclockwise as viewed from above, and negative for the direction opposite thereto.) Therefore, if the slip ratio Sfr is controlled around the peak point P, the running behavior control becomes unstable. The processing according to the flowchart of FIG. 4 is to avoid such a problem.

Referring to FIG. 4, in step 552, the factors Wdsfr and Wdsfl are normally set to 1 for convenience.

In step 554, it is judged if the slip angle βf of the front wheels is positive. (It is the general practice that the slip angle of a wheel is made positive when it is oriented leftward from the direction of rotation thereof, and negative for the direction opposite thereto.) When the answer is yes, the control proceeds to step 556, and it is judged if the nominal yaw moment Mn is negative. Therefore, the yes of the judgment of step 556 means that the vehicle is making a right turn, while the control exerts a clockwise yaw moment to the vehicle body. Under such a condition, if the front right wheel is braked much, there would occur that the yaw moment Mfr is controlled around the peak point P of FIG. 13B, thereby causing a fluctuation of the control. In order to avoid such a problem, in step 558, as an embodiment, the weighting factor Wdsfr for δSfr is set to 5, i.e. five times as much as compared with those for the other wheels, so that the value of δSfi is suppressed low to be apart, from the peak point P.

Similarly, when the answer of step 554 is no, and the answer of step 560 is yes, the weighting factor Wdsfl is set to 5.

In step 550, in order to obtain a difference in slip ratio at each of the three wheels which minimizes the value of L, equation 43 is partially differentiated by each δS as follows:

$$\frac{\partial L}{\partial \delta S} = 2Wds\delta S + 2Ws(S + \delta S) - 2J^T Wf JE \quad (50)$$

$$\frac{\partial L}{\partial \delta S} = \begin{bmatrix} \frac{\partial L}{\partial \delta Sfr} \text{ or } \frac{\partial L}{\partial \delta Sfl} \\ \frac{\partial L}{\partial \delta Srr} \\ \frac{\partial L}{\partial \delta Srl} \end{bmatrix} \quad (51)$$

$$E - \Delta - J\delta S \quad (52)$$

$$\frac{\partial E}{\partial \delta S} = \frac{\partial (\Delta - J\delta S)}{\partial \delta S} \quad (53)$$

$$= -J \quad (54)$$

Making $$\frac{\partial L}{\partial \delta S} = 0$$

in equation 50, $$Wds\delta S + Ws(S+\delta S) - J^T Wf(\Delta - J\delta S) = 0 \quad (55)$$

By rearranging equation 55 with respect to δS, there is provided an equation which minimizes the value of L of equation 43 as follows:

$$\delta S = (Wds + Ws + J^T WfJ)^{-1}(-WsS + J^T Wf\Delta) \quad (56)$$

In step 600, the slip ratios Si are modified by corresponding δSi calculated.

In step 650, the slip ratio Si is modified for a precaution of a spin which might be induced by the controlled braking of the rear wheels. When a vehicle is controlled by the running behavior control device of the present invention with one or both of the rear wheels being braked at a controlled slip ratio Srr and/or Srl to assist a turn running of the vehicle, it can occur that the turning of the vehicle overshoots. In such a case, it is desirable that the rear wheel braking is released as quick as possible, because otherwise a spin might be induced by a delay in releasing the rear wheel braking.

Figure 5:
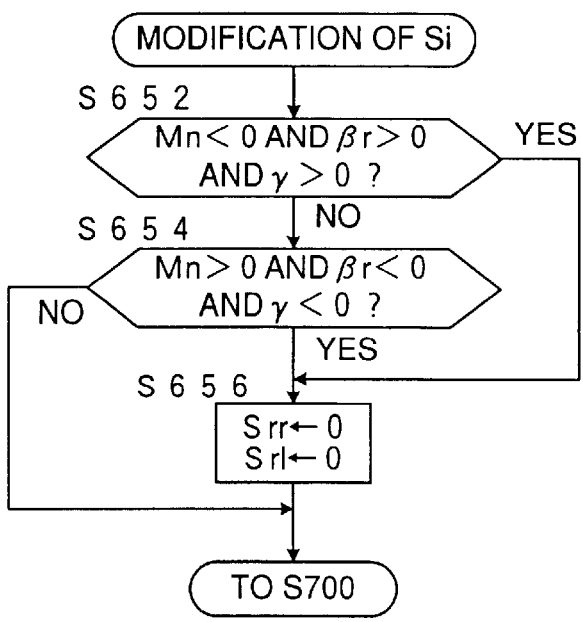
FIG. 5 is a flowchart showing a subroutine of the control operation executed in step 650 of the main routine.

In view of this, in the flowchart of FIG. 5 forming a subroutine of the main routine of FIG. 2, in step 652, it is judged if the nominal yaw moment Mn is negative and the slip ratio βr is positive and further the yaw rate γ is positive. During a normal right turn of a vehicle, generally there is a first stage in which Mn<0, βr>0 and γ<0, then a second stage in which Mn <0, βr>0 and γ=0, and then a third stage in which at least γ>0. In step 652 it is detected that the conditions turned over from the second stage to the third stage.

Similarly, in step 654 it is detected that the same turnover occurred during a left turn of the vehicle.

When the above turnover was detected in step 652 during a right turn or in step 654 during a left turn, the control proceeds to step 656, and the slip ratios Srr and Srl are immediately returned to zero.

In step 700, the hydraulic circuit 22 is operated according to a control signal bearing the instructions with regard to the slip ratios Si to be realized at the respective wheels.

Figure 6:
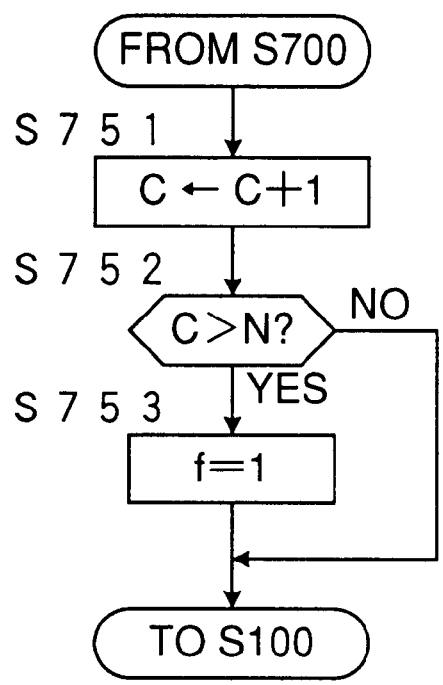
FIG. 6 is a flowchart showing a subroutine of the control operation executed in step 750 of the main routine.
Figure 7:
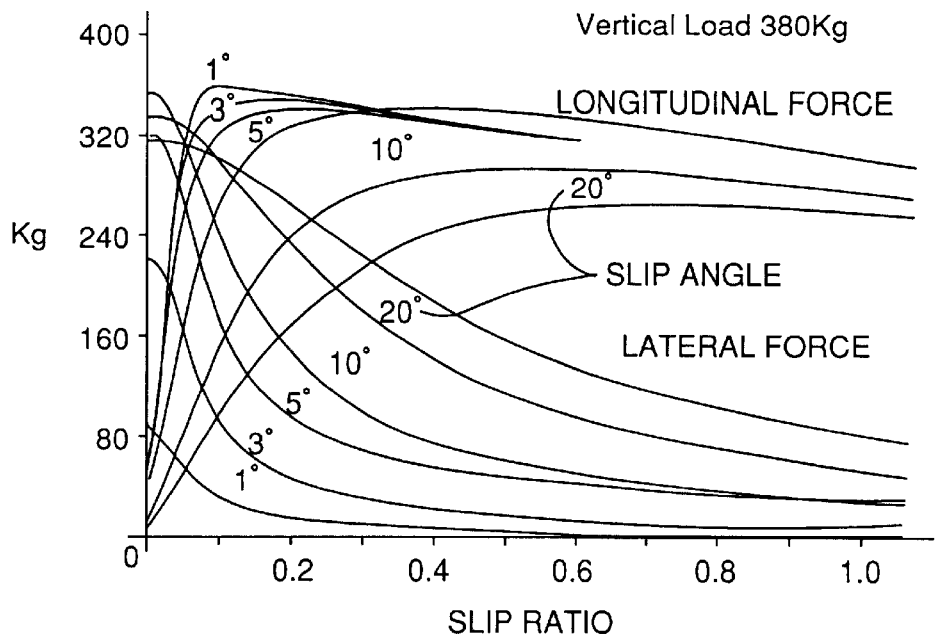
FIG. 7 is a map showing an example of the relationships among the longitudinal force, the lateral force, the slip ratio and the slip angle of a common tire.
Figure 11:
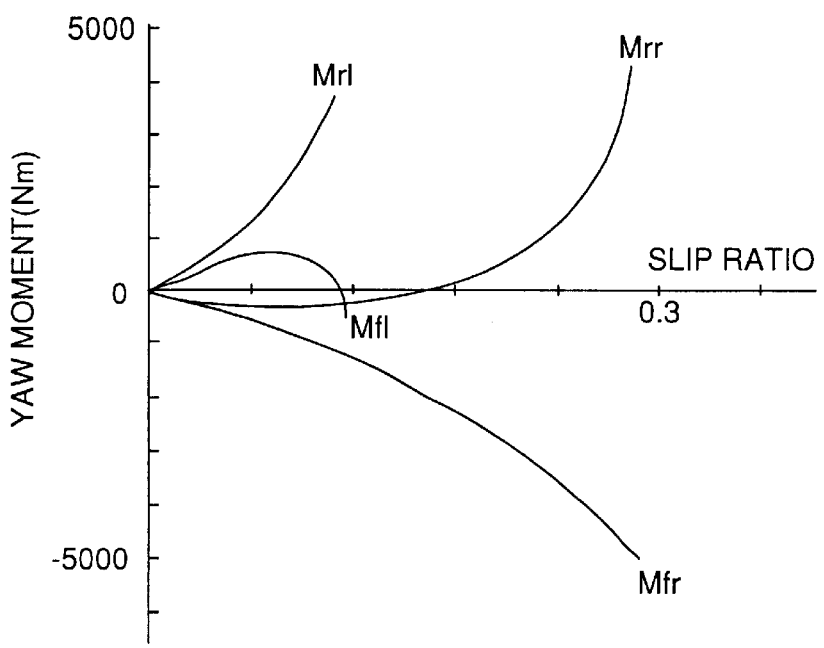
FIG. 11 is a map showing an example of the distribution of the yaw moment born by each of the front right, front left, rear right and rear left wheels of a four wheeled vehicle.
Figure 8:
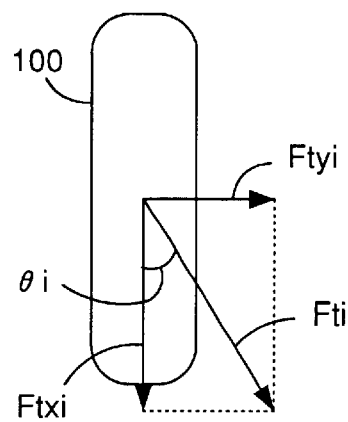
FIG. 8 is a diagrammatical illustration of a tire or wheel for defining parameters concerned therewith.
Figure 9:
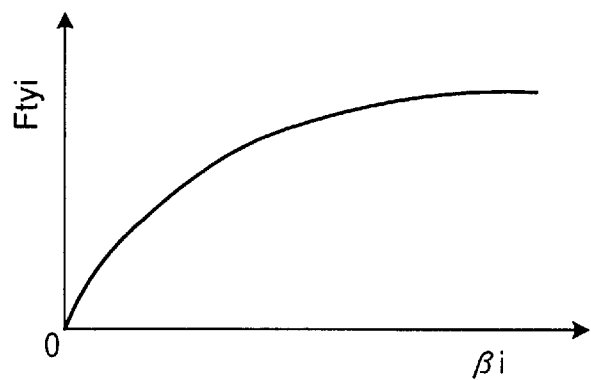
FIG. 9 is a graph showing a general relationship between the lateral force Ftyi and the slip angle $\beta i$ of a common tire or wheel.
Figure 10:
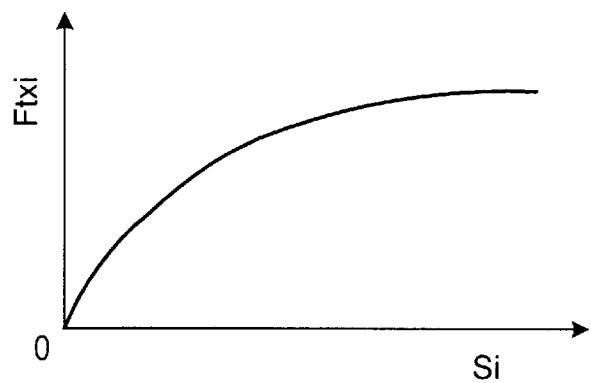
FIG. 10 is a graph showing a general relationship between the longitudinal force Ftxi and the slip angle Si of a common tire or wheel.

In step 750, a time required for a hydraulic pressure for the slip control according to the instructions with regard to the slip ratios Si to uprise in each of the wheels cylinders 24FR, 24FL, 24RR and 24RL is calculated according to a subroutine such as shown in FIG. 6.

Referring to FIG. 6, in step 751, count C of a counter incorporated in the electric control means 30 is incremented by 1. Then in step 752, it is judge if the count C is larger than a threshold number N determined to indicate that the time required for the hydraulic pressure for the slip control to uprise has lapsed. When the answer is yes, the control proceeds to step 753, and the flag f is set to 1, while when the answer is no, the control returns to step 100, bypassing step 753.

Thus, the calculations through the main routine of FIG. 2 are repeated at a cycle time such as tens of microseconds as long as the vehicle is operated with the ignition switch being turned on, while the calculations continually converging to each different state according to continual variations of the running conditions of the vehicle, realizing the condition that the braking for the running behavior control is executed at a minimum necessity to follow the tire model which executes no braking, while when there occurs such a malfunction in any part of the brake system pertaining to each of the front pair and the rear pair of wheels that an uncontrollable braking force is applied to the wheel, the running behavior control is modified to incorporate the uncontrollable braking force therein so that the running behavior of the vehicle is still stabilized in spite of the malfunction of the brake system. Of course, although not shown in the above described embodiment, when the control passes through any of steps 424, 427, 430 and 433, a pertinent warning lamp may be put on so that the customer will take his or her car to a service station as soon as possible.

Although the present invention has been described in detail with respect to a preferred embodiment thereof and some partial modifications thereof, it will be apparent for those skilled in the art that other various modifications are possible with respect to the shown embodiment within the scope of the present invention.

What is claimed is:

1. A device for controlling a running behavior of a vehicle based upon a force-slip performance of a tire, the vehicle having a vehicle body, a pair of front wheels and a pair of rear wheels, brake means for selectively applying a controlled braking force to each of the front pair and the rear pair of the wheels bearing the tires, and means for detecting a braking force applied to each of the front and rear pairs of wheels adapted to be applied with the controlled braking force, comprises:

first means for cyclically calculating by a minute cycle period longitudinal force and lateral force of each of the front and rear pairs of wheels in reference to slip ratio thereof according to a mathematical tire model of a relationship therebetween, so as to obtain a first longitudinal force and a first lateral force corresponding to a first slip ratio and a second longitudinal force and a second lateral force corresponding to zero slip ratio;

second means for cyclically calculating by the minute cycle period longitudinal force, lateral force and yaw moment of the vehicle body based upon the longitudinal forces and the lateral forces of the front pair and rear pairs of wheels, so as to obtain a first longitudinal force, a first lateral force and a first yaw moment of the vehicle body corresponding to the first longitudinal forces and the first lateral forces of the front and rear pairs of wheels and a second longitudinal force, a second lateral force and a second yaw moment of the vehicle body corresponding to the second longitudinal forces and the second lateral forces of the front and rear pairs of the wheels;

third means for cyclically modifying by the minute cycle period the second longitudinal force, the second lateral force and the second yaw moment of the vehicle body calculated by the second means with a longitudinal force, a lateral force and a yaw moment corresponding to an output of an outside running behavior controller, so as to obtain a nominal longitudinal force, a nominal lateral force and a nominal yaw moment, respectively;

fourth means for cyclically calculating by the minute cycle period a difference between the nominal longitudinal force and the first longitudinal force, a difference between the nominal lateral force and the first lateral force and a difference between the nominal yaw moment and the first yaw moment;

fifth means for cyclically calculating by the minute cycle period differentials of the longitudinal and lateral forces of each of the front and rear pairs of wheels on the basis of the slip ratio thereof according to the mathematical tire model;

sixth means for cyclically calculating by the minute cycle period differentials of the longitudinal force, lateral force and yaw moment of the vehicle body based upon differentials of the longitudinal and lateral forces of each of the front and rear pairs of wheels on the basis of the slip ratio;

seventh means for cyclically calculating by the minute cycle period a difference in the longitudinal force, a difference in the lateral force and a difference in the yaw moment of the vehicle body based upon the differentials thereof;

eighth means for cyclically calculating by the minute cycle period a first difference between the difference in the longitudinal force calculated by the fourth means and the difference in the longitudinal force calculated by the seventh means, a second difference between the difference in the lateral force calculated by the fourth means and the difference in the lateral force calculated by the seventh means, and a third difference between the difference in the yaw moment calculated by the fourth means and the difference in the yaw moment calculated by the seventh means;

ninth means for calculating by the minute cycle period differences in the slip ratio of each of the front and rear pairs of wheels which minimize a weighted sum of squares of the first, second and third differences; and tenth means for selectively operating the brake means to change the slip ratio of each of the front and rear pairs of wheels according to the difference thereof calculated by the ninth means, wherein the third means further cyclically modify the nominal longitudinal force and the nominal yaw moment to be decreased as much as an additional longitudinal force and an additional yaw moment, respectively, the additional longitudinal force and the additional yaw moment corresponding respectively to a sum of a longitudinal force and a sum of a yaw moment generated in the vehicle by a difference between an uncontrollable braking force detected by the braking force detection means with respect to each of the front and rear pairs of wheels and a braking force to be applied thereto according to the change of the slip ratio thereof effected by the tenth means.

2. A device according to claim 1, further comprising:

eleventh means for cyclically calculating by the minute cycle period a weighted sum of a square of each of the differences in the slip ratio calculated by the ninth means;

wherein the ninth means are modified to calculate the differences in the slip ratio so that a sum of the weighted sum calculated by the ninth means and the weighted sum calculated by the eleventh means is minimized.

3. A device according to claim 1, further comprising:

twelfth means for cyclically calculating by the minute cycle period a weighted sum of a square of each of respective sums of the slip ratio and the change thereof calculated by the ninth means;

wherein the ninth means are modified to calculate the differences in the slip ratio so that a sum of the weighted sum calculated by the ninth means and the weighted sum calculated by the twelfth means is minimized.

4. A device according to claim 2, further comprising:

twelfth means for cyclically calculating by the minute cycle period a weighted sum of a square of each of respective sums of the slip ratio and the change thereof calculated by the ninth means;

wherein the ninth means are modified to calculate the differences in the slip ratio so that a sum of the weighted sum calculated by the ninth means, the weighted sum calculated by the eleventh means and the weighted sum calculated by the twelfth means is minimized.

5. A device according to claim 1, wherein the third means modify the second longitudinal force, the second lateral force and the second yaw moment of the vehicle body calculated by the second means with the longitudinal force, the lateral force and the yaw moment corresponding to the output of the outside running behavior controller, so as to obtain the nominal longitudinal force, the nominal lateral force and the nominal yaw moment, respectively, by adding the longitudinal force, the lateral force and the yaw moment corresponding to the output of the outside running behavior controller to the second longitudinal force, the second lateral force and the second yaw moment, respectively.

6. A device according to claim 5, wherein the third means substantially cancel the lateral force corresponding to the output of the outside running behavior controller in obtaining the nominal lateral force.

7. A device according to claim 2, wherein the ninth means apply a variable weighting factor on each of the difference in the slip ratio of each of the front pair of wheels calculated thereby before outputting the calculated slip ratio difference such that a slip ratio difference applied with a larger weighting factor affects less in the running behavior control than a slip ratio difference applied with a smaller weighting factor, the weighting factor being varied such that, when the nominal yaw moment calculated by the third means is directed to assist a turn of the vehicle, the weighting factor on the slip ratio difference of one of the pair of front wheels serving at the inside of a turn is made larger.

8. A device according to claim 1, wherein the tenth means are adapted to cancel a braking of the rear wheels by overriding the difference of the slip ratio calculated by the ninth means when the yaw rate of the vehicle has changed its direction from a first direction conforming to a turning of the vehicle to a second direction opposite to the first direction during a turn running of the vehicle.

* * * * *